United States Patent
Nguyen et al.

(10) Patent No.: US 12,435,052 B2
(45) Date of Patent: Oct. 7, 2025

(54) SYSTEMS AND METHODS FOR REMOVING OR REDUCING WATER IN MIXTURES THAT INCLUDE T-BUTYL HYDROPEROXIDE

(71) Applicant: Lyondell Chemical Technology, L.P., Houston, TX (US)

(72) Inventors: Ha H. Nguyen, Houston, TX (US); Xueyong Yang, Bellaire, TX (US)

(73) Assignee: Lyondell Chemical Technology, L.P., Houston, TX (US)

( * ) Notice: Subject to any disclaimer, the term of this patent is extended or adjusted under 35 U.S.C. 154(b) by 218 days.

(21) Appl. No.: 17/958,845

(22) Filed: Oct. 3, 2022

(65) Prior Publication Data

US 2023/0105219 A1    Apr. 6, 2023

Related U.S. Application Data

(60) Provisional application No. 63/251,909, filed on Oct. 4, 2021.

(51) Int. Cl.
| | | |
|---|---|---|
| *C07D 301/19* | (2006.01) | |
| *B01D 61/36* | (2006.01) | |
| *B01J 19/24* | (2006.01) | |
| *C02F 1/44* | (2023.01) | |
| *C02F 101/34* | (2006.01) | |

(52) U.S. Cl.
CPC ......... *C07D 301/19* (2013.01); *B01D 61/362* (2013.01); *B01J 19/245* (2013.01); *C02F 1/448* (2013.01); *C02F 2101/34* (2013.01)

(58) Field of Classification Search
CPC ..... C07D 301/19; B01D 61/362; C02F 1/448; B01J 19/245
See application file for complete search history.

(56) References Cited

U.S. PATENT DOCUMENTS

| | | | |
|---|---|---|---|
| 5,107,001 A | 4/1992 | Gelb et al. | |
| 5,539,131 A * | 7/1996 | Lin ...................... | C07D 301/19 568/571 |
| 5,760,253 A * | 6/1998 | Danner ................. | C07D 301/19 549/529 |
| 10,100,009 B2 | 10/2018 | Nguyen | |

FOREIGN PATENT DOCUMENTS

| | | | | |
|---|---|---|---|---|
| WO | WO-2004037782 A1 * | 5/2004 | ......... | B01D 61/3621 |
| WO | WO-2013057121 A1 * | 4/2013 | ........... | C07D 301/19 |

OTHER PUBLICATIONS

The International Search Report and The Written Opinion for PCT/US2022/045545 mailed Dec. 22, 2022.

* cited by examiner

*Primary Examiner* — Andrew D Kosar
*Assistant Examiner* — Phillip Matthew Rzeczycki

(57) ABSTRACT

Methods and systems for removing or reducing water and producing epoxide. The methods may include providing a first mixture that includes t-butyl hydroperoxide, t-butyl alcohol, and a first amount of water; and contacting at least a portion of the first mixture with a membrane to reduce the amount of water in the first mixture.

16 Claims, 2 Drawing Sheets

SYSTEMS AND METHODS FOR REMOVING OR REDUCING WATER IN MIXTURES THAT INCLUDE T-BUTYL HYDROPEROXIDE

CROSS-REFERENCE TO RELATED APPLICATION

This application claims the benefit of priority to U.S. Provisional Patent Application No. 63/251,909, filed on Oct. 4, 2021, which is incorporated herein by reference in its entirety.

BACKGROUND

In typical processes that use t-butyl hydroperoxide to produce propylene oxide, a first step may include reacting isobutane with oxygen to form a mixture of t-butyl hydroperoxide and t-butyl alcohol. This mixture usually is purified, and the resulting purified mixture is reacted with propylene to produce propylene oxide.

When the mixture or purified mixture of t-butyl hydroperoxide and t-butyl alcohol includes a relatively high water concentration (e.g., >2 wt. %), propylene oxide selectivity can be reduced significantly, due at least in part to the fact that propylene oxide can react with water to form one or more undesirable byproducts, such as mono propylene glycol.

There remains a need for effective and/or economical processes for reducing the amount of water in a mixture or purified mixture that includes t-butyl hydroperoxide.

BRIEF SUMMARY

Provided herein are methods and systems for removing or reducing an amount of water in mixtures that include t-butyl hydroperoxide, including mixtures that can be used in propylene epoxidation to produce propylene oxide. In some embodiments, the methods and systems herein can reduce an amount of water in a mixture including t-butyl hydroperoxide to 0.1%, by weight, or less, based on the weight of the mixture.

In one aspect, methods are provided for removing or reducing an amount of water in mixtures that include t-butyl hydroperoxide, including mixtures that can be used in propylene epoxidation to produce propylene oxide. In some embodiments, the methods include providing a first mixture including t-butyl hydroperoxide, t-butyl alcohol, and a first amount of water; contacting at least a portion of the first mixture with a membrane one or more times to produce a second mixture including t-butyl hydroperoxide, t-butyl alcohol, and a second amount of water, wherein the second amount of water is at least 50% less than the first amount of water; and contacting the second mixture with propylene to produce a third mixture including propylene oxide and t-butyl alcohol.

In another aspect, systems are provided for producing an epoxide following the removal or reduction of water in mixtures that include t-butyl hydroperoxide. In some embodiments, the systems include a feed mixture comprising t-butyl hydroperoxide, t-butyl alcohol, and a first amount of water; a membrane module comprising a membrane, the membrane module receiving the feed mixture and contacting the feed mixture with the membrane one or more times to produce a first mixture stream and a second mixture stream, wherein the first mixture stream comprises t-butyl hydroperoxide, t-butyl alcohol, and a second amount of water, the second amount of water being at least 30% less by weight than the first amount of water; and an epoxidation reactor receiving the first mixture stream and reacting the first mixture stream with propylene in the presence of a catalyst to produce a product stream comprising propylene oxide.

Additional aspects will be set forth in part in the description which follows, and in part will be obvious from the description, or may be learned by practice of the aspects described herein. The advantages described herein will be realized and attained by means of the elements and combinations particularly pointed out in the appended claims. It is to be understood that both the foregoing general description and the following detailed description are exemplary and explanatory and are not restrictive.

DETAILED DESCRIPTION

Provided herein are methods and systems for removing or reducing an amount of water in mixtures that include t-butyl hydroperoxide, including mixtures that can be used in propylene epoxidation to produce propylene oxide.

Methods for Removing/Reducing Water

Figure 1:
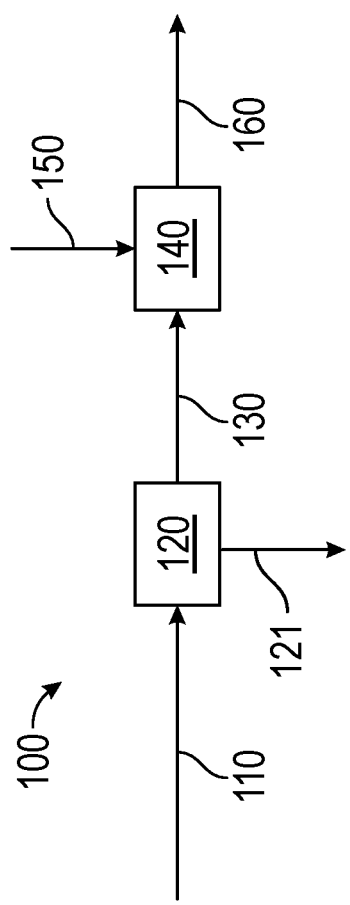
FIG. 1 depicts a schematic of an embodiment of a method described herein.

An embodiment of a method described herein is depicted schematically at FIG. 1. The method 100 of FIG. 1 includes providing a first mixture 110. The first mixture 110 may include t-butyl hydroperoxide, t-butyl alcohol, and a first amount of water. At least a portion of the first mixture 110 is contacted with a membrane 120 to produce a second mixture 130 and a third mixture 121. The second mixture 130 includes t-butyl hydroperoxide, t-butyl alcohol, and a second amount of water. The second amount of water is at least 50% less, by weight, than the first amount of water. The second mixture 130 is contacted in a reservoir 140 with propylene 150 to produce a third mixture 160 that includes propylene oxide and t-butyl alcohol. In some embodiments, the membrane 120 is a pervaporation membrane. The reservoir 140 may include any known reactor or container that facilitates the contacting of reactants. The third mixture 121 includes t-butyl hydroperoxide, t-butyl alcohol, and a third amount of water.

In some embodiments, the methods include providing a first mixture including t-butyl hydroperoxide, t-butyl alcohol, and a first amount of water. In some embodiments, the first amount of water is present in the first mixture at an amount of at least 2%, at least 2.2%, at least 2.4%, at least 2.6%, at least 2.8%, or at least 3%, by weight, based on the weight of the first mixture. In some embodiments, the first amount of water is present in the first mixture at an amount of about 2% to about 5%, about 2% to about 4%, or about 2% to about 3%, by weight, based on the weight of the mixture.

Figure 2:
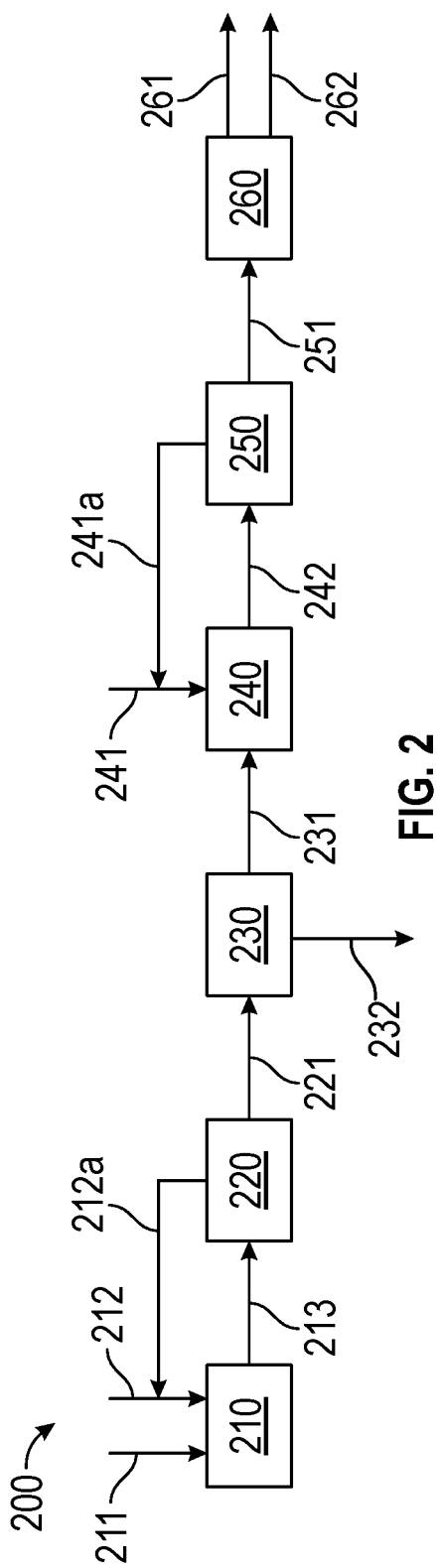
FIG. 2 depicts a schematic of an embodiment of a method described herein.

In some embodiments, the providing of the first mixture includes contacting isobutane and oxygen gas to produce the first mixture. The first mixture may be purified with a debutanizer to remove all or a portion of isobutane from the first mixture. The removed isobutane may be recycled, as depicted at FIG. 2.

Processes for producing a first mixture are well known in the art. For example, processes for preparing a mixture including t-butyl hydroperoxide are described at U.S. Pat. No. 10,100,009, which is incorporated by reference.

The production of a first mixture (e.g., an initial t-butyl hydroperoxide oxidate solution by, e.g., the oxidation of isobutane) may be achieved in a conventional manner. For example, the oxidation of isobutane may be carried out as a liquid phase oxidation using an oxygen source, such as, e.g., air or molecular oxygen, brought into contact with isobutane typically at one or more temperatures in the range of about 100° C. to about 200° C., and at pressures typically in the range of about 300 psig to about 700 psig (i.e., about 2.07 to about 4.83 MPa), optionally in the absence of metal ions or other reactants in the reaction mixture, and optionally in the presence of added water.

Non-limiting examples of this and other suitable processes for producing a first mixture can be found in U.S. Pat. Nos. 2,845,461; 3,478,108; 5,243,084, and 4,408,081, the disclosures of which are incorporated by reference. These processes may produce a solution having a t-butyl hydroperoxide concentration typically in a range of about 30 to about 48 wt % in the liquid phase. The resulting initial t-butyl hydroperoxide oxidate solution may then be fed to a debutanizer for the removal of isobutane in a conventional distillation manner, as both t-butyl hydroperoxide and t-butyl alcohol have much higher normal boiling points than that of isobutane, as described, for example, in U.S. Pat. Nos. 4,128,587 and 5,104,493, the disclosures of which are incorporated herein by reference. The resulting debutanized material may be a first mixture, which may be fed as starting material to a vacuum distillation column for vacuum distillation, to form a concentrated first mixture.

A first mixture may include any amount of t-butyl hydroperoxide. In some embodiments, the first mixture includes about 30% to about 50%, about 35% to about 45%, or about 40%, by weight, of t-butyl hydroperoxide, based on the weight of the first mixture.

In some embodiments, the methods include contacting at least a portion of the first mixture with a membrane one or more times to produce a second mixture including t-butyl hydroperoxide, t-butyl alcohol, and a second amount of water.

In some embodiments, the membrane is a pervaporation membrane. In some embodiments, a temperature of the first mixture prior to the contacting of at least a portion of the first mixture with the membrane is about 80° C. to about 100° C., or about 85° C. to about 95° C.

In some embodiments, the second amount of water is at least 50%, at least 55%, at least 60%, at least 65%, at least 70%, at least 75%, at least 80%, at least 85%, or at least 90% less than the first amount of water.

In some embodiments, the second amount of water is present in the second mixture at an amount of about 0.01% to about 0.5%, about 0.01% to about 0.4%, about 0.01% to about 3%, about 0.01% to about 2%, about 0.01% to about 1%, about 0.01% to about 0.5%, about 0.01% to about 0.2%, about 0.05% to about 0.2%, about 0.08% to about 0.15%, about 0.08% to about 0.12%, or about 0.1%, by weight, based on the weight of the second mixture.

In some embodiments, the methods include contacting the second mixture with propylene to produce a third mixture including propylene oxide and t-butyl alcohol. In some embodiments, the contacting of the second mixture with propylene occurs in the presence of a catalyst. The catalyst may include molybdenum. In some embodiments, the third mixture is purified with a depropanizer to remove or reduce the amount of propylene in the third mixture. The propylene may be recycled, as depicted herein at FIG. 2. The components of the third mixture may be separated as depicted at FIG. 2.

An embodiment of a method described herein is depicted schematically at FIG. 2. The method 200 of FIG. 2 includes contacting oxygen gas 211 and isobutane 212 in a oxidation reactor 210 to produce a first mixture 213 that may include t-butyl hydroperoxide, t-butyl alcohol, unreacted isobutane, and a first amount of water. The first mixture 213 is purified with a debutanizer 220 to produce a purified first mixture 221 that includes no unreacted isobutane or a reduced amount of isobutane. The unreacted isobutane 212a is recycled to the reservoir 210 in the embodiment of the method 200 of FIG. 2. The purified first mixture 221, or a portion thereof, is contacted one or more times with a membrane 230 to produce a second mixture 231 and a third mixture 232. The second mixture 231 includes t-butyl hydroperoxide, t-butyl alcohol, and a second amount of water. The second amount of water is at least 50% less, by weight, than the first amount of water. The third mixture 232 includes t-butyl hydroperoxide, t-butyl alcohol, and a third amount of water. The second mixture 231 is contacted in a reservoir 240 with propylene 241 to produce a fourth mixture 242 that includes propylene oxide, t-butyl alcohol, and unreacted propylene. The fourth mixture 242 is purified with a depropanizer 250 to produce a purified fourth mixture 251 that includes no unreacted propylene or a reduced amount of propylene. The unreacted propylene 241a is recycled to the reservoir 240 in the embodiment of the method 200 of FIG. 2. The purified fourth mixture 251 is then separated into propylene oxide 261 and t-butyl alcohol 262 by a separation apparatus 260. In some embodiments, the membrane 230 is a pervaporation membrane. The reservoirs (210, 240) may include any known reactor or container that facilitates the contacting of reactants. In some embodiments, the separation apparatus 260 may be a distillation column.

The reservoir 240 may be an epoxidation reactor. The epoxidation reaction conditions in the epoxidation reactor may vary. For example, temperatures can be preferably in the range of about 50° C. to about 120° C.; pressures can be about atmospheric to about 1,000 psig (about 6.89 MPa); the propylene and t-butyl hydroperoxide molar ratio can be preferably about 2:1 to about 10:1; molybdenum catalyst concentration in an epoxidation solution can be preferably about 25 ppm to about 300 ppm. Other potential epoxidation reaction conditions may be employed. Non-limiting examples of suitable epoxidation reaction conditions may be found in U.S. Pat. Nos. 10,100,009, 3,351,635, 5,107,001 and 4,988,830, all of which are incorporated herein by reference.

Systems for Producing Epoxide

Also provided herein are systems for removing or reducing an amount of water in mixtures that include t-butyl hydroperoxide, including mixtures that can be used in propylene epoxidation to produce propylene oxide. The systems may be used to perform any of the methods describe herein.

In some embodiments, the systems include a first reservoir, wherein the first reservoir includes a first reservoir inlet and a first reservoir outlet. A first mixture may be disposed in the first reservoir. The first mixture may be any of those described herein. In some embodiments, the first mixture includes t-butyl hydroperoxide, t-butyl alcohol, and a first amount of water.

The systems described herein may include a membrane module. The membrane module may include a first chamber, a second chamber, and a membrane having a first side and a second side. The first chamber may be defined at least in part by the first side of the membrane, and the second chamber may be defined at least in part by the second side of the membrane.

In some embodiments, the first chamber includes a first chamber inlet in fluid communication with the first reservoir outlet of the first reservoir, and the first chamber includes a first chamber outlet in fluid communication with the first reservoir inlet of the first reservoir.

The second chamber may include a second chamber outlet.

The systems, in some embodiments, include a second reservoir. The second reservoir may include a second reservoir inlet in fluid communication with the second chamber outlet of the second chamber.

Figure 3:
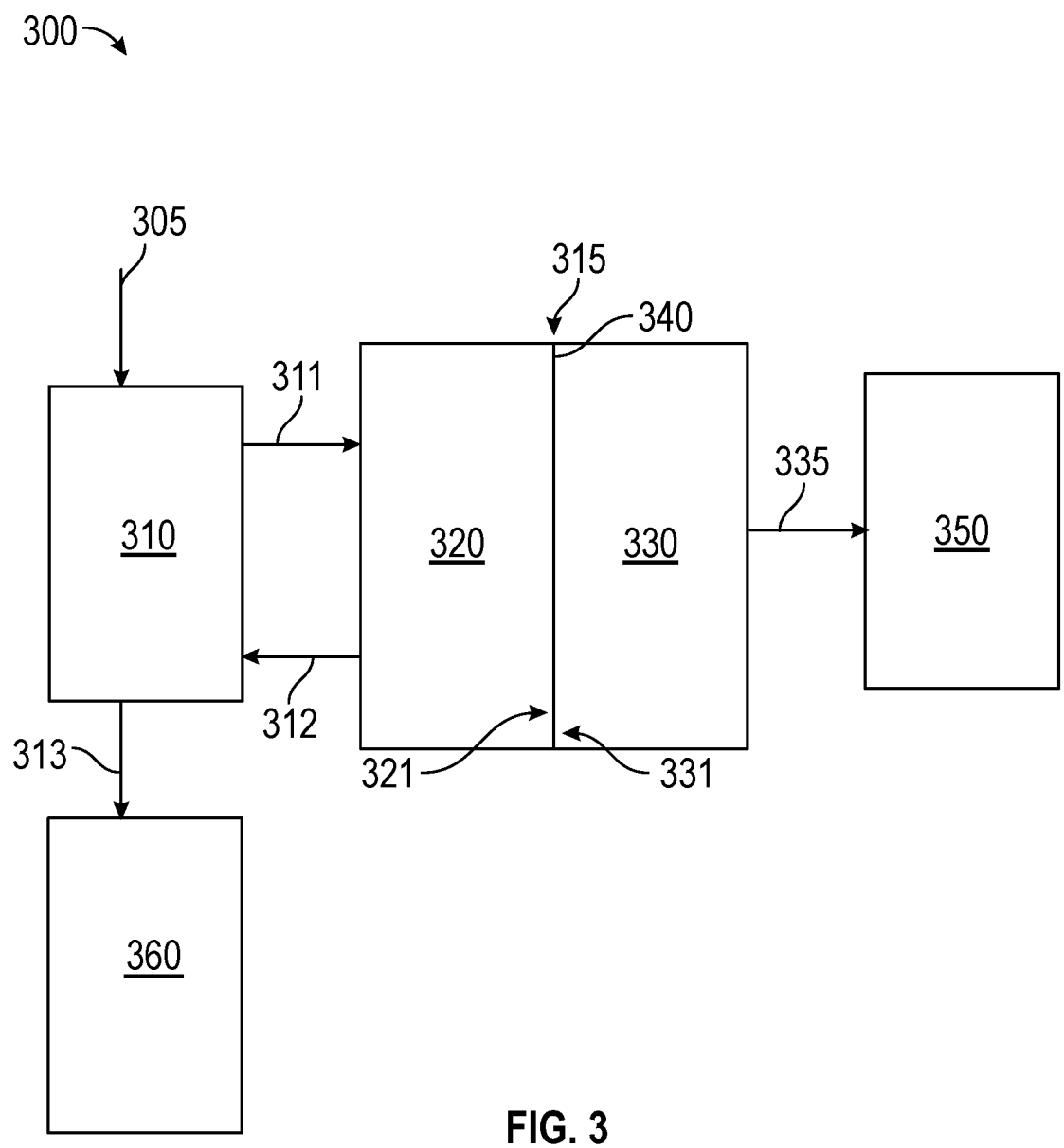
FIG. 3 depicts a schematic of an embodiment of a system described herein.

An embodiment of a system described herein is depicted at FIG. 3. The system 300 of FIG. 3 includes a first reservoir 310, a membrane module 315, a second reservoir 350, and an epoxidation reactor 360. Membrane module 315 includes two chambers, first chamber 320 and second chamber 330, that are separated from one another by membrane 340. The first chamber 320 is defined at least in part by the first side 321 of membrane 340. The second chamber 330 is defined at least in part by the second side 331 of membrane 340. First reservoir 310 is in fluid communication with the first chamber 320 of membrane module 315 via first discharge line 311 and return line 312. First reservoir 310 is also in fluid communication with epoxidation reactor 360 via third discharge line 313. Second chamber 330 of membrane module 315 is in fluid communication with second reservoir 350 via second discharge line 335.

First reservoir 310 may be receive a first mixture via inlet line 305. The first mixture may comprise: t-butyl hydroperoxide, t-butyl alcohol, and a first amount of water. The first mixture may be circulated from first reservoir 310 through first discharge line 311 to first chamber 320 of membrane module 315 where the first mixture contacts the first side 321 of membrane 340 before passing through return line 312 back to reservoir 310. As the first mixture contacts membrane 340, water present in the mixture passes therethrough to second chamber 330. In this way the quantity of water in the mixture circulating between the first reservoir 310 and the first chamber 320 is reduced. The mixture accumulated in the second chamber 330 of membrane module 315, including t-butyl hydroperoxide, t-butyl alcohol, and water, may be sent to the second reservoir 350 via second discharge line 335 for further processing. The mixture remaining in the first reservoir 310 may be sent to the epoxidation reactor 360 via third discharge line 313, which may include one or more valves. This remaining mixture may contain a reduced amount of water compared to the quantity of water present in the first mixture. Said another way, the concentration of organic components (e.g., t-butyl hydroperoxide and t-butyl alcohol) in the remaining mixture resident in first reservoir 310 is increased.

One or more components of the system 300 of FIG. 3 may be used as the membrane 120 of the embodiment of the method depicted at FIG. 1, or the membrane 230 of the embodiment of the method depicted at FIG. 2.

In some embodiments, the mixture accumulated in the second chamber 330 of the membrane module 315 may include t-butyl hydroperoxide, t-butyl alcohol, and a second amount of water. In some embodiments, the concentration of water in the mixture accumulated in the second chamber 330 of the membrane module 315 is greater than the concentration of water in the first mixture. In some embodiments, the concentration of water in the mixture accumulated in the second chamber 330 of the membrane module 315 is 10% greater than the concentration of water in the first mixture. In some embodiments, the concentration of water in the mixture accumulated in the second chamber 330 of the membrane module 315 is 20% greater than the concentration of water in the first mixture. In some embodiments, the concentration of water in the mixture accumulated in the second chamber 330 of the membrane module 315 is 30% greater than the concentration of water in the first mixture. In some embodiments, the concentration of water in the mixture accumulated in the second chamber 330 of the membrane module 315 is 40% greater than the concentration of water in the first mixture. In some embodiments, the concentration of water in the mixture accumulated in the second chamber 330 of the membrane module 315 is 50% greater than the concentration of water in the first mixture.

In some embodiments, the remaining mixture sent to the epoxidation reactor 360 may include t-butyl hydroperoxide, t-butyl alcohol, and a second amount of water. In some embodiments, the amount of water in the remaining mixture is less than the amount of water in the first mixture. In some embodiments, the amount of water in the remaining mixture is 10% less than the amount of water in the first mixture. In some embodiments, the amount of water in the remaining mixture is 20% less than the amount of water in the first mixture. In some embodiments, the amount of water in the remaining mixture is 30% less than the amount of water in the first mixture. In some embodiments, the amount of water in the remaining mixture is 40% less than the amount of water in the first mixture. In some embodiments, the amount of water in the remaining mixture is 50% less than the amount of water in the first mixture. In some embodiments, the amount of water in the remaining mixture is 60% less than the amount of water in the first mixture.

In some embodiments, the epoxidation reactor 360 may receive a feed of propylene. In some embodiments, the epoxidation reactor 360 may contain a catalyst. In some embodiments, the catalyst may comprise molybdenum.

The membrane module may include any membrane described herein. In some embodiments, the membrane module includes a pervaporation membrane unit.

The following examples merely illustrate the systems and methodologies of this disclosure. Those skilled in the art will recognize many variations that are within the spirit of this disclosure and the scope of the claims.

EXAMPLES

The present disclosure is further illustrated by the following examples, which are not to be construed in any way as imposing limitations upon the scope thereof. On the contrary, it is to be understood that resort may be had to various other aspects, embodiments, modifications, and equivalents thereof which, after reading the description herein, may suggest themselves to one of ordinary skill in the art without departing from the spirit of the present disclosure or the scope of the appended claims. Thus, other aspects will be apparent to those skilled in the art from consideration of the specification and practice of the subject matter disclosed herein.

Example 1—Removal of Water

In this example, water was removed from a mixture that included t-butyl hydroperoxide and t-butyl alcohol. Membrane pervaporation was performed in this example in a system like the embodiment depicted at FIG. 3.

The initial mixture included t-butyl hydroperoxide (40%, by weight, based on the weight of the mixture), water (2.12%, by weight, based on the weight of the mixture), and t-butyl alcohol.

With reference to FIG. 3, the initial mixture (2401.93 g) was disposed in the first reservoir 310, heated to a temperature of about 85° C. to about 95° C., and provided to the first chamber 320 at a flow rate of about 0.5 kg/min. to about 0.8 kg/min. The amount of water collected in the epoxidation reactor 360 was monitored at the times indicated at the following table.

| Time (Min) | Water Level |
|---|---|
| 0 | 2.12% |
| 30 | 1.21% |
| 60 | 0.974% |
| 120 | 0.384% |
| 180 | 0.206% |
| 240 | 0.155% |

The foregoing test was repeated with an initial mixture having a lower starting water content of 1.6%, by weight, based on the weight of the mixture. The second test was performed with the following parameters.

| Component/Parameter | Value |
|---|---|
| Initial Mixture Contents | t-butyl hydroperoxide (40%, by weight, based on the weight of the mixture) Water (1.6%, by weight, based on the weight of the mixture) |
| Initial Mixture Amount | 2294.1 g |
| Permeate Sample I | 53.21 g; 56.1%, by weight, water, based on the weight of the sample |
| Product | 1993.97 g; 0.206%, by weight, water, based on the weight of the product |
| Flow Rate | About 0.5 to about 0.8 kg/min. |
| Feed Temperature | About 85° C. to about 95° C. |

The amount of water in the permeate was monitored at the times indicated in the following table.

| Time (Min) | Water Level |
|---|---|
| 0 | 1.60% |
| 30 | 1.02% |
| 60 | 0.601% |
| 120 | 0.378% |
| 180 | 0.264% |
| 240 | 0.204% |

The foregoing test was repeated with an initial mixture having a lower starting water content of 0.33%, by weight, based on the weight of the mixture. The third test was performed with the following parameters.

| Component/Parameter | Value |
|---|---|
| Initial Mixture Contents | t-butyl hydroperoxide (40%, by weight, based on the weight of the mixture) Water (0.33%, by weight, based on the weight of the mixture) |
| Initial Mixture Amount | 1990.3 g |
| Permeate Sample I | 18.0 g; 20.91%, by weight, water, based on the weight of the sample |
| Product | 1848.9 g; 0.101%, by weight, water, based on the weight of the product |
| Flow Rate | About 0.5 to about 0.8 kg/min. |
| Feed Temperature | About 85° C. to about 95° C. |

The amount of water in the permeate was monitored at the times indicated in the following table.

| Time (Min) | Water Level |
|---|---|
| 0 | 0.326% |
| 30 | 0.267% |
| 60 | 0.246% |
| 120 | 0.164% |
| 180 | 0.125% |
| 240 | 0.108% |

The tests of this example demonstrated an effective reduction in the amount of water in the mixtures including t-butyl hydroperoxide.

Example 2—Analysis of Byproduct Formation

This example, along with Examples 3 and 4, demonstrate that the t-butyl hydroperoxide oxidate having a relatively lower water concentration resulted in less by-product formation. In these examples, mono propylene glycol was used as an indicator.

In this example, a t-butyl hydroperoxide oxidate with a relatively high water concentration was used.

Specifically, a propylene oxide/t-butyl alcohol epoxidation run was performed by mixing 251.3 g of propylene with 189.9 g of a mixture that included t-butyl hydroperoxide (42%, by weight, based on the weight of the mixture), water (0.9%, by weight, based on the weight of the mixture), and a 5.3 g of a catalyst solution (containing 1.62 wt % molybdenum) in t-butyl alcohol.

The reactants were maintained at a temperature of about 117° C. using a conventional heating source, and a pressure of about 700 psig to about 750 psig (i.e., about 4.83 to about 5.17 MPa).

After 70 minutes, the reactor contained the following materials:

| Product/Reactant | Amount |
|---|---|
| t-butyl hydroperoxide | 1.95 g |
| propylene oxide | 42.4 g |
| mono propylene glycol | 0.64 g |

Example 3—Analysis of Byproduct Formation

In this example, a t-butyl hydroperoxide oxidate with a relatively low water concentration was used.

Specifically, a propylene oxide/t-butyl alcohol epoxidation run was performed by mixing 244.9 g of propylene with 189.8 g of a mixture that included t-butyl hydroperoxide (42%, by weight, based on the weight of the mixture), water (0.4%, by weight, based on the weight of the mixture), and a 5.1 g of a catalyst solution (containing 1.62 wt % molybdenum) in t-butyl alcohol.

The reactants were maintained at a temperature of about 117° C. using a conventional heating source, and a pressure of about 700 to about 750 psig (i.e., about 4.83 to about 5.17 MPa).

After 70 minutes, the reactor contained the following materials:

| Product/Reactant | Amount |
| --- | --- |
| t-butyl hydroperoxide | 1.7 g |
| propylene oxide | 46.1 g |
| mono propylene glycol | 0.26 g |

The results of this example indicated that the use of a t-butyl hydroperoxide mixture containing 0.4 wt % of water resulted in about a 60% reduction of mono propylene glycol in the product compared to the tests of Example 2, which used a t-butyl hydroperoxide mixture containing 0.9 wt % of water.

Example 4—Analysis of Byproduct Formation

In this example, another t-butyl hydroperoxide oxidate with an even lower water concentration was used.

Specifically, a propylene oxide/t-butyl alcohol epoxidation run was performed by mixing 246.8 g of propylene with 189.8 g of a mixture that included t-butyl hydroperoxide (42%, by weight, based on the weight of the mixture), water (0.1%, by weight, based on the weight of the mixture), and a 5.1 g of a catalyst solution (containing 1.62 wt % molybdenum) in t-butyl alcohol.

The reactants were maintained at a temperature of about 117° C. using a conventional heating source, and a pressure of about 700 to about 750 psig (i.e., about 4.83 to about 5.17 MPa).

After 70 minutes, the reactor contained the following materials:

| Product/Reactant | Amount |
| --- | --- |
| t-butyl hydroperoxide | 1.5 g |
| propylene oxide | 48.4 g |
| mono propylene glycol | 0.1 g |

The results of this example indicated that the use of a t-butyl hydroperoxide mixture containing 0.1 wt % of water resulted in about an 84% reduction of mono propylene glycol in the product compared to the tests of Example 2, which used a t-butyl hydroperoxide mixture containing 0.9 wt % of water.

ADDITIONAL DISCLOSURE

Embodiments disclosed herein include:

A: a method for producing epoxide, the method comprising: providing a first mixture comprising t-butyl hydroperoxide, t-butyl alcohol, and a first amount of water; contacting at least a portion of the first mixture with a membrane one or more times to produce a second mixture comprising t-butyl hydroperoxide, t-butyl alcohol, and a second amount of water, wherein the second amount of water is at least 30% less than the first amount of water; and reacting the second mixture with propylene to produce a third mixture comprising propylene oxide and t-butyl alcohol.

B: a system for producing an epoxide comprising: a feed mixture comprising t-butyl hydroperoxide, t-butyl alcohol, and a first amount of water; a membrane module comprising a membrane, the membrane module receiving the feed mixture and contacting the feed mixture with the membrane one or more times to produce a first mixture stream and a second mixture stream, wherein the first mixture stream comprises t-butyl hydroperoxide, t-butyl alcohol, and a second amount of water, the second amount of water being at least 30% less by weight than the first amount of water; and an epoxidation reactor receiving the first mixture stream and reacting the first mixture stream with propylene in the presence of a catalyst to produce a product stream comprising propylene oxide.

Embodiments A and B may have one or more of the following additional elements:

Element 1: wherein the first amount of water is present in the first mixture at an amount of at least 2.0%, by weight, based on the weight of the first mixture. Element 2: wherein the first amount of water is present in the first mixture at an amount of at least 2.5%, by weight, based on the weight of the first mixture. Element 3: wherein the first amount of water is present in the first mixture at an amount of at least 3.0%, by weight, based on the weight of the first mixture. Element 4: wherein the first amount of water is present in the first mixture at an amount of at least 3.5%, by weight, based on the weight of the first mixture. Element 5: wherein the first amount of water is present in the first mixture at an amount of at least 4.0%, by weight, based on the weight of the first mixture. Element 6: wherein the second amount of water is at least 30% less than the first amount of water. Element 7: wherein the second amount of water is at least 40% less than the first amount of water. Element 8: wherein the second amount of water is at least 50% less than the first amount of water. Element 9: wherein the second amount of water is at least 60% less than the first amount of water. Element 10: wherein the second amount of water is at least 70% less than the first amount of water. Element 11: wherein the second amount of water is at least 75% less than the first amount of water. Element 12: wherein the second amount of water is at least 80% less than the first amount of water. Element 13: wherein the second amount of water is present in the second mixture at an amount of about 0.01% to about 0.5%, by weight, based on the weight of the second mixture. Element 14: wherein the second amount of water is present in the second mixture at an amount of about 0.08% to about 0.15%, by weight, based on the weight of the second mixture. Element 15: wherein the second amount of water is present in the second mixture at an among of about 0.05% to about 0.3% by weight, based on the weight of the second mixture. Element 16: wherein the second amount of water is present in the second mixture at an among of about 0.03% to about 0.23% by weight, based on the weight of the second mixture. Element 17: wherein the second amount of water is present in the second mixture at an among of about 0.10% to about 0.25% by weight, based on the weight of the second mixture. Element 18: wherein the second amount of water is present in the second mixture at an among of about 0.01% to about 0.1% by weight, based on the weight of the second mixture. Element 19: wherein a temperature of the first mixture prior to the contacting of at least a portion of the first mixture with the membrane is about 80° C. to about 100° C. Element 20: wherein a temperature of the first mixture prior to the contacting of at least a portion of the first mixture with the membrane is about 70° C. to about 90° C. Element 21: wherein a temperature of the first mixture prior to the contacting of at least a portion of the first mixture with the membrane is about 90° C. to about 110° C. Element 22: wherein the contacting of the second mixture with propylene occurs in the presence of a catalyst. Element 23: wherein the catalyst comprises molybdenum. Element 24: wherein the membrane is a pervaporation membrane. Element 25: additionally comprising a depropanizer, wherein the depropanizer receives the product stream from the epoxidation reactor, the product stream additionally comprises unreacted propylene, and the depropanizer separates at least a portion of the unreacted propylene from the product stream. Element 26: wherein the unreacted propylene separated from the product stream is recycled to the epoxidation reactor. Element 27: additionally comprising a separation apparatus, wherein the product stream additionally comprises t-butyl alcohol, and the separation apparatus separates at least a portion of the t-butyl alcohol from the product stream. Element 28: additionally comprising: a oxidation reactor wherein oxygen gas and isobutane are reacted to produce an oxidation mixture comprising t-butyl hydroperoxide, t-butyl alcohol, unreacted isobutane, and water; and a debutanizer which receives the oxidation mixture, separates at least a portion of the unreacted isobutane from the oxidation mixture thereby producing the feed mixture. Element 29: wherein the unreacted isobutane separated from the oxidation mixture is recycled to the oxidation reactor. Element 30: wherein the membrane module comprises a pervaporation membrane unit.

The terms "a," "an," and "the" are intended to include plural alternatives, e.g., at least one. For instance, the disclosure of "a membrane," "a reservoir," and the like, is meant to encompass one, or mixtures or combinations of more than one membrane, reservoir, and the like, unless otherwise specified.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various components or steps, the methods or systems can also "consist essentially of" or "consist of" the various components or steps, unless stated otherwise.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, numerical end points of ranges disclosed herein are approximate. As a representative example, Applicant discloses, in one embodiment, that a third amount of water is present in the second mixture at an amount of about 0.08% to about 0.12%, based on the weight of the second mixture. This range should be interpreted as encompassing values in a range of about 0.08% to about 0.12%, and further encompasses "about" each of 0.09%, 0.10%, and 0.11%, including any ranges and sub-ranges between any of these values.

Throughout this application, the term "about" is used to indicate that a value includes a variation of error, such as for the device, the method being employed to determine the value, or the variation that exists among the study subjects. The term "about" is used to imply the natural variation of conditions and represent a variation of plus or minus 5% of a value. In some embodiments, the variation is plus or minus 1% of a value.

As used herein, the phrase "at least a portion of" is used to indicate a portion less than or equal to the entire portion. For example, at least a portion of a material may refer to any quantity or amount of the material other than zero. By way of further example, at least a portion of a mixture may refer to any quantity or amount of the mixture other than zero. By way of yet further example, at least a portion of a process may refer to any portion or part of the entire process.

The processes described herein may be carried out or performed in any order as desired in various implementations. Additionally, in certain implementations, at least a portion of the processes may be carried out in parallel. Furthermore, in certain implementations, less than or more than the processes described may be performed.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims

What is claimed is:

1. A method for producing epoxide, the method comprising:
providing a first mixture comprising t-butyl hydroperoxide, t-butyl alcohol, and a first amount of water, wherein the first amount of water is present in the first mixture at an amount of at least 2%, by weight, based on the weight of the first mixture;
contacting at least a portion of the first mixture with a membrane one or more times to produce a second mixture comprising t-butyl hydroperoxide, t-butyl alcohol, and a second amount of water, wherein the second amount of water is at least 30% less than the first amount of water, and wherein the second amount of water is present in the second mixture at an amount of about 0.01% to about 0.5%, by weight, based on the weight of the second mixture; and
reacting the second mixture comprising the second amount of water with propylene to produce a third mixture comprising propylene oxide and t-butyl alcohol.

2. The method of claim 1, wherein the second amount of water is present in the second mixture at an amount of about 0.01% to about 0.4%, by weight, based on the weight of the second mixture.

3. The method of claim 1, wherein the second amount of water is present in the second mixture at an amount of about 0.08% to about 0.15%, by weight, based on the weight of the second mixture.

4. The method of claim 1, wherein the second amount of water is at least 75% less than the first amount of water.

5. The method of claim 1, wherein a temperature of the first mixture prior to the contacting of at least a portion of the first mixture with the membrane is about 80° C. to about 100° C.

6. The method of claim 1, wherein the contacting of the second mixture with propylene occurs in the presence of a catalyst.

7. The method of claim 1, wherein the membrane is a pervaporation membrane.

8. A system for producing an epoxide, the system comprising:
a feed mixture comprising t-butyl hydroperoxide, t-butyl alcohol, and a first amount of water, wherein the first amount of water is present in the first mixture at an amount of at least 2%, by weight, based on the weight of the first mixture;
a membrane module comprising a membrane, the membrane module receiving the feed mixture and contacting the feed mixture with the membrane one or more times to produce a first mixture stream and a second mixture stream, wherein the first mixture stream comprises t-butyl hydroperoxide, t-butyl alcohol, and a second amount of water, the second amount of water being at least 30% less by weight than the first amount of water, and wherein the second amount of water is present in the second mixture at an amount of about 0.01% to about 0.5%, by weight, based on the weight of the second mixture; and an epoxidation reactor receiving the first mixture stream and reacting the first mixture stream comprising the second amount of water with propylene in the presence of a catalyst to produce a product stream comprising propylene oxide.

9. The system of claim 8 additionally comprising a depropanizer, wherein the depropanizer receives the product stream from the epoxidation reactor, the product stream additionally comprises unreacted propylene, and the depropanizer separates at least a portion of the unreacted propylene from the product stream.

10. The system of claim 9 wherein the unreacted propylene separated from the product stream is recycled to the epoxidation reactor.

11. The system of claim 9 additionally comprising a separation apparatus, wherein the product stream additionally comprises t-butyl alcohol, and the separation apparatus separates at least a portion of the t-butyl alcohol from the product stream.

12. The system of claim 8 additionally comprising:
an oxidation reactor wherein oxygen gas and isobutane are reacted to produce an oxidation mixture comprising t-butyl hydroperoxide, t-butyl alcohol, unreacted isobutane, and water; and
a debutanizer which receives the oxidation mixture, separates at least a portion of the unreacted isobutane from the oxidation mixture thereby producing the feed mixture.

13. The system of claim 12 wherein the unreacted isobutane separated from the oxidation mixture is recycled to the oxidation reactor.

14. The system of claim 8 wherein the membrane module comprises a pervaporation membrane unit.

15. A method for producing epoxide, the method comprising:
providing a first mixture comprising t-butyl hydroperoxide, t-butyl alcohol, and a first amount of water;
contacting at least a portion of the first mixture with a membrane one or more times to produce a second mixture comprising t-butyl hydroperoxide, t-butyl alcohol, and a second amount of water, wherein the second amount of water is at least 30% less than the first amount of water, and wherein the second amount of water is present in the second mixture at an amount of about 0.08% to about 0.15%, by weight, based on the weight of the second mixture; and
reacting the second mixture comprising the second amount of water with propylene to produce a third mixture comprising propylene oxide and t-butyl alcohol.

16. The method of claim 15, wherein the membrane is a pervaporation membrane.

* * * * *